Patented Aug. 5, 1958

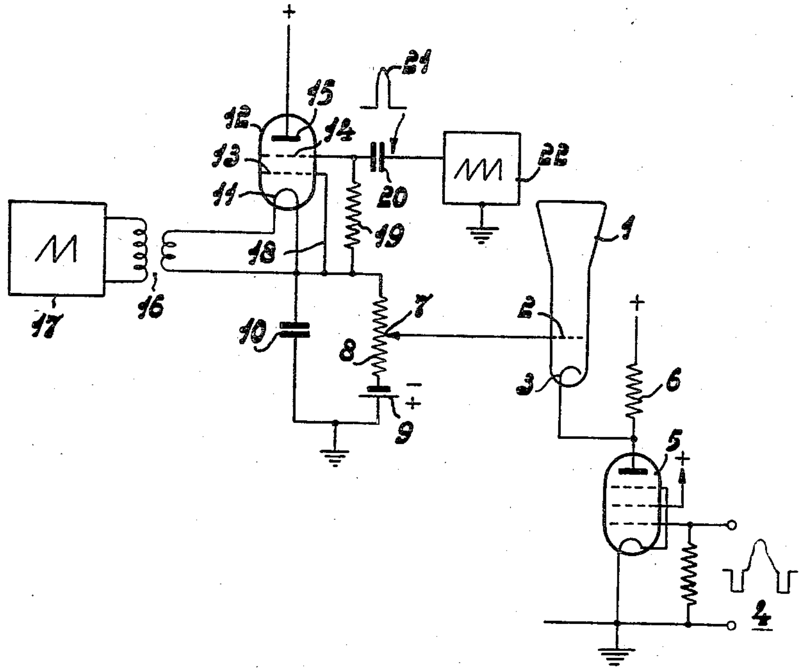
INVENTOR
HENRICUS JACOBUS GITS.
JOHANNES VERBOOM
BY Fred M. Vogel
AGENT United States Patent Office 2,846,616

2,846,616

CIRCUIT-ARRANGEMENT PROTECTING THE CATHODE-RAY TUBE OF TELEVISION RECEIVERS

Henricus Jacobus Gits and Johannes Verboom, Eindhoven, Netherlands, assignors, by mesne assignments, to North American Philips Company, Inc., New York, N. Y., a corporation of Delaware Application November 25, 1955, Serial No. 549,087

Claims priority, application Netherlands December 8, 1954

3 Claims. (Cl. 315—20)

This invention relates to circuit arrangements protecting the cathode-ray tube of television receivers, in which arrangements a capacitor is charged, with operative deflection means of the receiver, via a tube whose preferably directly heated cathode is supplied from the picture deflection circuit, and unblocking voltage pulses derived from the picture deflection circuit are supplied to a control electrode, the capacitor voltage neutralising the action of a voltage suppressing the cathode-ray beam.

In known circuit arrangements of this type, the tube is constructed as a triode having a directly heated cathode. The unblocking pulses from the line deflection circuit are supplied to the control-grid of the triode. Such arrangements suffer from two difficulties. Primarily the life expectancy of the triode is very small, since the unblocking pulses provide a peak voltage of approximately 600 v. between the control-grid and the filament. Second, the direct voltage produced across the capacitor was found to be highly dependent upon the amplitude of the line sawtooth current, hence upon the amplitude of the unblocking pulses.

The present invention has for its object to provide a circuit arrangement mitigating said disadvantages.

The circuit-arrangement in accordance with the invention has the feature that the unblocking pulses are supplied to a control electrode of the tube, which control electrode cuts off the anode current of the tube upon attaining cathode potential.

In order that the invention may be readily carried into effect it will now be described with reference to the accompanying drawing, given by way of example, in which the reference numeral 1 denotes a cathode-ray tube which is represented only diagrammatically and comprises a control electrode 2 and a cathode 3. The video signal 4 is amplified by the tube 5 and the signal across the anode resistor 6 of the tube 5 is supplied in known manner to the cathode 3 of the cathode-ray tube 1. The control electrode 2 is connected to the tapping 7 on a resistor 8, one end of which is connected to the negative terminal of a battery 9, the other terminal of which is grounded. Connected between earth and the other end of resistor 7 is connected a capacitor 10. The non-earthed terminal of the capacitor 10 is connected to the filament 11 of a tube 12. This tube comprises a first control-grid 13, a screen grid 14 and an anode 15, which anode is connected to the positive terminal of the anode supply. The filament 11 is supplied from the picture deflection circuit 17 via a transformer 16 in a known manner as represented only diagrammatically. The first control-grid 13 is connected in a direct current manner through a conductor 18 to the filament 11. Connected between the filament 11 and the screen grid 14 is a resistor 19 to which the pulse-voltage designated by 21 is supplied via a capacitor 20, which voltage is derived in known manner from the line deflection circuit 22.

With operative deflection circuits 17, 22 the filament 11 of the tube 12 is supplied and the tube is periodically made conductive on the appearance of pulses 21 with the result that the capacitor 10 is positively charged via the tube 12. The positive voltage across the capacitor 10 neutralises the voltage supplied by the battery 9, which voltage normally would suppress the cathode-ray beam of the cathode-ray tube 1, thus conditioning the tube 1 for the reproduction of television pictures. Correct adjustment of the intensity of the cathode-ray beam is secured by adjusting the luminosity control 7. If one or both deflection circuits 17 and 22 are inoperative the positive voltage across the capacitor 10 disappears with the result that the cut-off voltage from the battery 9 is set up at the control electrode 2 of the cathode-ray tube. Said operation of the circuit arrangement is known per se.

In known circuit arrangements using a triode, it was necessary to apply to the control-grid a high negative bias exceeding the negative bias of the battery 9 in order to cut off the tube upon failure of the line deflection circuit 22. On the other hand, in order that the tube should be conductive on the appearance of pulses 21, the amplitude of said pulses had to be very considerable, for example 600 volts. In the circuit-arrangement in accordance with the invention, the pulses 21 are now supplied to a control electrode which, if its potential is equal to the filament potential, cuts off the tube. As a result the amplitude of the pulses 21, which need not now first compensate a high negative bias, can be chosen considerably smaller, say of the order of approximately 100 to 200 volts.

What is claimed is:

1. A circuit for protecting a cathode-ray tube which has a control electrode for controlling the cathode-ray intensity, comprising a source of protection voltage connected to said electrode and having a value at which said cathode-ray has a safe intensity which is lower than normal operating intensity, an electron-discharge tube having a cathode, a first grid, a second grid and an anode arranged in the named order, a source of reference potential connected to said first grid, a capacitor and a source of operating voltage connected in a closed series circuit with the cathode-anode path of said electron-discharge tube, a first source of pulsatory signals connected to supply heating energy for said cathode and a second source of pulsatory signals connected to said second grid, whereby said capacitor is charged by said operating voltage only when both of said pulsatory signals occur, and means connected to apply the charge voltage of said capacitor to said control electrode to neutralize the effect of said protection voltage.

2. A circuit as claimed in claim 1, in which said first and second sources of pulsatory signals comprise vertical and horizontal deflection circuits associated with said cathode-ray tube.

3. A circuit as claimed in claim 1, in which said second grid is a screen grid having a cut-off voltage point which is substantially equal to the cathode voltage of said electron-discharge tube.

References Cited in the file of this patent

UNITED STATES PATENTS

| | | |
|---|---|---|
| 2,210,702 | Bowman-Manifold | Aug. 6, 1940 |
| 2,222,426 | White et al. | Nov. 19, 1940 |
| 2,258,370 | Taylor et al. | Oct. 7, 1941 |
| 2,261,645 | Delvaux | Nov. 4, 1941 |
| 2,261,776 | Poch | Nov. 4, 1941 |
| 2,514,079 | Lockhart | July 4, 1950 |